United States Patent
Hannebaum et al.

(10) Patent No.: US 10,782,864 B1
(45) Date of Patent: Sep. 22, 2020

(54) TWO-AXIS SLIDER GRAPHICAL USER INTERFACE SYSTEM AND METHOD

(71) Applicant: Sprint Communications Company L.P., Overland Park, KS (US)

(72) Inventors: Ryan K. Hannebaum, Prairie Village, KS (US); Kenneth L. Jones, Overland Park, KS (US); Christa L. Minks-Brown, Olathe, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 543 days.

(21) Appl. No.: 15/183,783

(22) Filed: Jun. 16, 2016

Related U.S. Application Data

(63) Continuation of application No. 14/245,822, filed on Apr. 4, 2014, now abandoned.

(51) Int. Cl.
*G06F 3/0484* (2013.01)
*G06Q 30/02* (2012.01)
*G06F 3/0482* (2013.01)

(52) U.S. Cl.
CPC ........ *G06F 3/04847* (2013.01); *G06F 3/0482* (2013.01); *G06F 3/0484* (2013.01); *G06F 3/04842* (2013.01); *G06Q 30/0251* (2013.01); *G06Q 30/0269* (2013.01); *G06Q 30/0267* (2013.01)

(58) Field of Classification Search
CPC .. G06F 3/04847; G06F 3/0482; G06F 3/0484; G06F 3/04842; G06F 17/30867; G06F 17/30029; G06Q 30/0251; G06Q 30/0267; G06Q 30/0269; G06Q 30/0271
See application file for complete search history.

(56) References Cited

U.S. PATENT DOCUMENTS

| | | | | |
|---|---|---|---|---|
| 6,348,936 B1* | 2/2002 | Berteig | ............... | G06F 3/04855 715/784 |
| 7,003,476 B1* | 2/2006 | Samra | ............... | G06Q 10/0635 705/7.28 |
| 8,799,078 B1* | 8/2014 | Kniaz | ............... | G06Q 30/0242 705/14.4 |

(Continued)

OTHER PUBLICATIONS

U.S. Appl. No. 14/258,878 (Year: 2014).*

(Continued)

*Primary Examiner* — Kieu D Vu
*Assistant Examiner* — Rami R Okasha

(57) ABSTRACT

Embodiments of the disclosure are directed to a two-axis slider graphical user interface system and method. A work station may comprise a processor, non-transitory memory, and an application that when executed by the processor, displays a graphical user interface comprising a two-axis slider within a two-dimensional space that is bounded by a first axis and a second axis, the first axis and second axis corresponding with a first selection method and second selection method, respectively. The work station receives, via the two-axis slider, an adjustment and input criteria that are sent to a server. The work station automatically receives selection of a weighted portion for each of the two selection methods and receives a selection of a defined number of mobile devise corresponding to each weighted portion, and feedback is dynamically displayed on the graphical user interface.

15 Claims, 5 Drawing Sheets

(56) References Cited

U.S. PATENT DOCUMENTS

| | | | |
|---|---|---|---|
| 9,374,335 B2* | 6/2016 | Burcham | H04L 51/38 |
| 10,535,082 B1 | 1/2020 | Hannebaum et al. | |
| 2002/0095333 A1* | 7/2002 | Jokinen | G06Q 30/02 |
| | | | 705/14.26 |
| 2004/0054572 A1* | 3/2004 | Oldale | G06F 16/337 |
| | | | 706/1 |
| 2007/0027756 A1* | 2/2007 | Collins | G06F 17/2785 |
| | | | 705/14.58 |
| 2007/0156621 A1* | 7/2007 | Wright | G06Q 30/02 |
| | | | 706/48 |
| 2007/0156887 A1* | 7/2007 | Wright | G06Q 30/02 |
| | | | 709/224 |
| 2007/0192744 A1* | 8/2007 | Reponen | G06F 3/0236 |
| | | | 715/833 |
| 2007/0234236 A1* | 10/2007 | Champion | G06F 3/04847 |
| | | | 715/833 |
| 2008/0065476 A1* | 3/2008 | Klein | G06O 30/02 |
| | | | 705/14.13 |
| 2008/0082411 A1* | 4/2008 | Jensen | G06Q 30/02 |
| | | | 705/14.48 |
| 2008/0120565 A1 | 5/2008 | Stiso et al. | |
| 2008/0270223 A1* | 10/2008 | Collins | G06Q 30/02 |
| | | | 705/14.42 |
| 2009/0029721 A1* | 1/2009 | Doraswamy | G06Q 30/02 |
| | | | 455/456.3 |
| 2009/0076899 A1 | 3/2009 | Gbodimowo | |
| 2009/0198580 A1* | 8/2009 | Broberg | G06Q 30/02 |
| | | | 705/14.1 |
| 2009/0256858 A1 | 10/2009 | Ogikubo et al. | |
| 2009/0293019 A1* | 11/2009 | Raffel | G06F 3/04847 |
| | | | 715/833 |
| 2010/0119111 A1 | 5/2010 | Heitman et al. | |
| 2010/0228592 A1* | 9/2010 | Anderson | G06Q 30/00 |
| | | | 705/14.54 |
| 2011/0066488 A1* | 3/2011 | Ludewig | G06Q 30/00 |
| | | | 705/14.43 |
| 2011/0258049 A1* | 10/2011 | Ramer | G06F 17/30867 |
| | | | 705/14.66 |
| 2012/0036480 A1* | 2/2012 | Warner | G06F 3/04847 |
| | | | 715/833 |
| 2012/0150630 A1* | 6/2012 | Hicken | G06Q 30/0249 |
| | | | 705/14.48 |
| 2013/0211904 A1* | 8/2013 | Bax | G06O 30/0251 |
| | | | 705/14.41 |
| 2013/0332260 A1* | 12/2013 | Cheng | G06Q 30/0243 |
| | | | 705/14.42 |
| 2013/0339146 A1* | 12/2013 | Goldberg | G06Q 30/02 |
| | | | 705/14.53 |
| 2014/0012659 A1* | 1/2014 | Yan | G06Q 30/0241 |
| | | | 705/14.42 |
| 2014/0074627 A1* | 3/2014 | Kucharz | G06Q 30/02 |
| | | | 705/14.72 |
| 2014/0108162 A1* | 4/2014 | Kumar | G06Q 30/02 |
| | | | 705/14.72 |
| 2014/0172573 A1* | 6/2014 | Saurabh | G06Q 30/0261 |
| | | | 705/14.58 |
| 2014/0278913 A1* | 9/2014 | Martel | G06Q 30/02 |
| | | | 705/14.41 |
| 2014/0379467 A1* | 12/2014 | Huang | G06O 30/0281 |
| | | | 705/14.53 |
| 2015/0006277 A1* | 1/2015 | Delug | G06Q 30/0244 |
| | | | 705/14.43 |
| 2015/0121418 A1 | 4/2015 | Jain et al. | |
| 2017/0364535 A9* | 12/2017 | Lavine | G06F 17/30554 |

OTHER PUBLICATIONS

Final Office Action dated Jul. 28, 2016, U.S. Appl. No. 14/245,822, filed Apr. 4, 2014.

Advisory Action dated Oct. 7, 2016, U.S. Appl. No. 14/245,822, filed Apr. 4, 2014.

FAIPP Pre-Interview Communication dated Feb. 16, 2016, U.S. Appl. No. 14/245,822, filed Apr. 4, 2014.

First Action Interview Office Action dated Apr. 28, 2016, U.S. Appl. No. 14/245,822, filed Apr. 4, 2014.

Hannebaum, Ryan K., et al., entitled, "Advertisement Campaign Target Selection Engine," filed Apr. 4, 2014, U.S. Appl. No. 14/245,822.

Hannebaum, Ryan K., et al., entitled, "Hybrid Selection of Target for Advertisement Campaign," filed Apr. 22, 2014, U.S. Appl. No. 14/258,878.

Advisory Office dated Jun. 15, 2018, U.S. Appl. No. 14/258,878, filed Apr. 22, 2014.

FAIPP Office Action dated Sep. 7, 2017, U.S. Appl. No. 14/258,878, filed Apr. 22, 2014.

Final Office Action dated Mar. 14, 2018, U.S. Appl. No. 14/258,878, filed Apr. 22, 2014.

Carl Sassenrath, REBOL Technologies, GUI: Stepped Sliders, Article: #0158, Dec. 1, 2008 (Year: 2008).

FAIPP Pre-Interview Communication dated Apr. 4, 2017, U.S. Appl. No. 14/258,878, filed Apr. 22, 2014.

Dunay, Paul, et al., entitled, "Facebook Advertising for Dummies," 2011, Wiley Publishing, Inc., pp. 13, 29-31, and 44-51.

Office Action dated Jan. 10, 2019, U.S. Appl. No. 14/258,878, filed Apr. 22, 2014.

Notice of Allowance dated Aug. 7, 2019, U.S. Appl. No. 14/258,878, filed Apr. 22, 2014.

Ragan, Matthew, "2D Sliders | TouchDesigner", https://matthewragan.com/2014/04/21/2d-sliders-touchdesigner/ Apr. 21, 2014.

Hannebaum, Ryan K., et al., entitled, "Hybrid Selection of Target for Advertisement Campaign," filed Nov. 5, 2019, U.S. Appl. No. 16/675,183.

* cited by examiner

TWO-AXIS SLIDER GRAPHICAL USER INTERFACE SYSTEM AND METHOD

CROSS-REFERENCE TO RELATED APPLICATIONS

This application is a continuation of and claims priority under 35 U.S.C. § 120 to U.S. patent application Ser. No. 14/245,822, filed on Apr. 4, 2014, entitled "Advertisement Campaign Target Selection Engine", by Ryan K. Hannebaum, et al., which is incorporated herein by reference in its entirety for all purposes.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Advertising content may be presented to users of mobile communication devices when the users employ functions of the device such as internet access, gaming, or other sponsored applications. Devices capable of displaying this sort of advertising content may include mobile phones, portable digital assistants, tablets, and laptop and desktop computers. The advertising content may include videos, still images, text, html, rich media, and/or links to offers or discounts at a particular vendor, or to a chain or subsidiary of a particular vendor. The advertisements may vary based on the type and size of the advertisement that can be inserted into the content. Selecting specific users to be sent advertisements based on the characteristics of those users, for example the age of the users or the income level of the users may be referred to as targeting users and the advertisements sent to those selected users may be referred to as targeted ads. Advertisements may be sent to a user or target based on demographic or behavioral information about the user, and advertisements may be sent to targets as a part of an advertisement campaign. A target for an advertisement campaign may be selected from a group of people based on an increased probability that the target will respond to the advertisement campaign.

SUMMARY

In an embodiment, a method for selecting targets for an advertisement campaign is disclosed. The method comprises: adjusting a first axis that controls a first target selection method; adjusting a second axis that controls a second target selection method; filtering potential targets based on the adjustments by an application executed by a computer system; ranking potential targets based on the adjustments by an application executed by a computer system; selecting at least a portion of the potential targets based on the results of filtering and ranking; and sending one or more advertisements to the selected targets, wherein a target for an advertisement campaign may be selected from a group of people based on an increased probability that the target will respond to the advertisement campaign; the first target selection method adjusts selecting targets between demographics and behavior; the second target selection method adjusts selecting targets between filtering and ranking; and the first and second axes may be shown on and controlled via a user interface.

In an embodiment, a method for choosing targets for an advertisement campaign is disclosed. The method comprises: adjusting a first axis that controls a first selection method; receiving feedback based on the adjustments; filtering potential targets based on the adjustment; ranking potential targets based on the adjustment; selecting at least a portion of the potential targets based on the results of filtering and ranking; and sending advertisements to the selected targets, wherein the first axis may be shown on and controlled via a user interface, and the feedback is shown on the user interface with the first axis.

In an embodiment, a computer system is disclosed. The computer system comprises: a processor; a memory; an application stored in the memory that, when executed by the processor, receives instructions for analyzing a group of potential targets, wherein at least a portion of the instructions comprises a slider control input, and a pre-defined number of targets; determines a selection method for selecting potential targets based on the received instructions; accesses database information for the potential targets, wherein database information comprises demographic information and behavioral information; analyzes the group of potential targets based on the received instructions as well as the database information; and selects the pre-defined number of targets for the advertisement campaign based on the selection method and analysis, wherein: the slider control input is adjustable, and the application adapts the selection method based on the adjustments.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
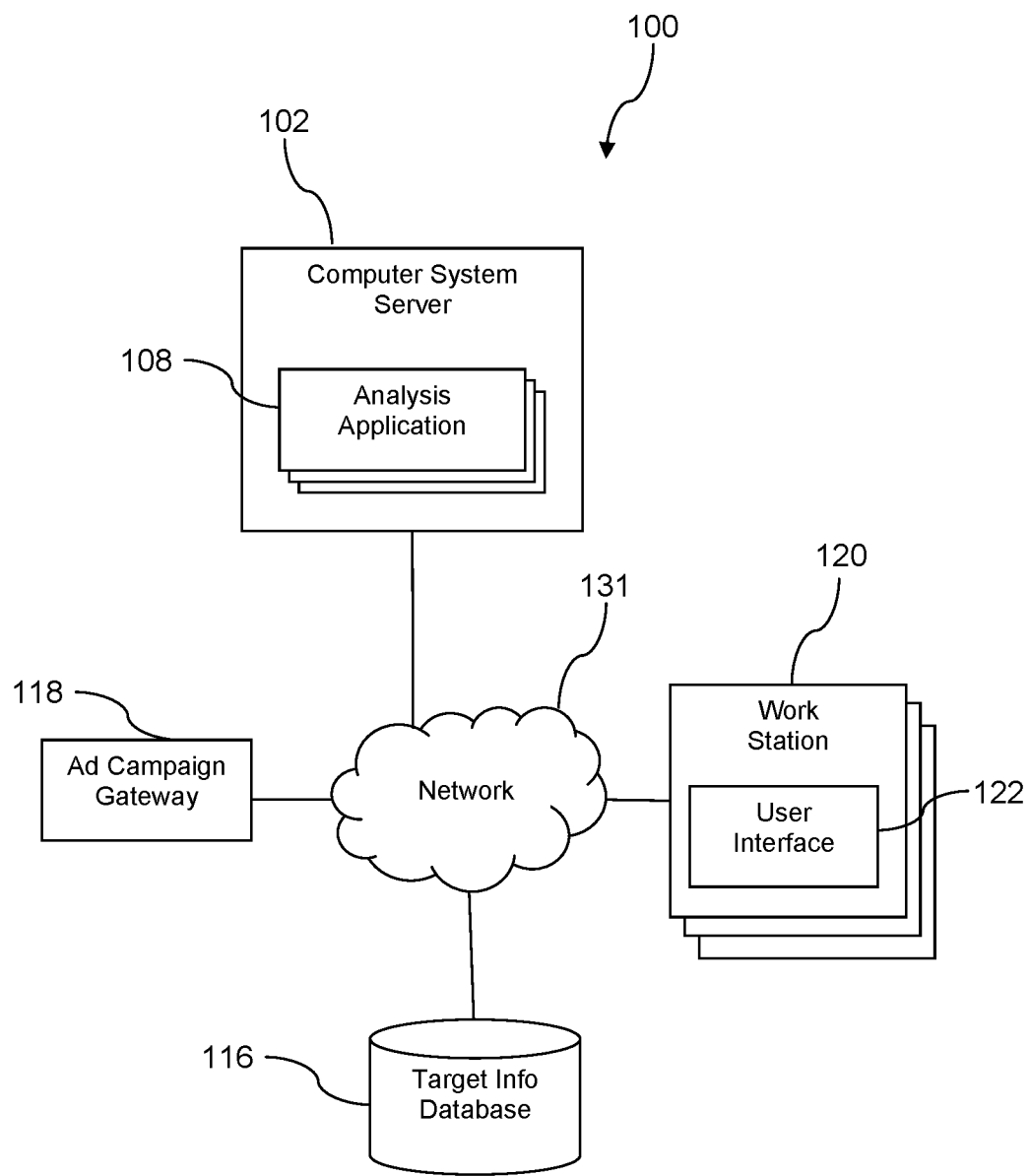
FIG. 1 is an illustration of a communication system according to an embodiment of the disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

Embodiments of the disclosure are directed to methods and systems for selecting targets for an advertisement campaign. As used herein, the term target may mean an individual who is selected for sending an advertisement to, for example a subscriber having a known profile selected for sending an advertisement to about a new car. A wireless communication service provider may have tens of millions of subscribers, each one being a potential target. The present disclosure teaches, among other things, how to select targets from a large population of potential targets, for example from among tens of millions of wireless communication service subscribers.

A target for an advertisement campaign may be selected from a group of people based on a calculation that the target has an increased probability (e.g., an above average probability relative to an undifferentiated pool of potential targets, for example tens of millions of subscribers) that the target will respond to the advertisement campaign. The calculation of this probability may be based on the demographic and/or behavioral information about the target. For example, an individual with an annual income greater than $70,000 in the age bracket 35 to 55 may be calculated to have an above average probability, relative to an undifferentiated population of individuals (e.g., including other individuals with annual incomes less than $70,000 who are younger than 35 or older than 55), of responding to a car ad for a luxury car.

Methods of the disclosure may comprise adjusting one or more slider axis that controls one or more target selection method, wherein the selection method(s) may comprise using target demographic data, target behavioral data, filtering criteria, and/or ranking criteria to select targets for the advertisement campaign. The slider axis may allow a user to adjust particular target selection criteria substantially continuously between a first extreme and a second extreme of the selection criteria dimension. Based on the adjustments, an analysis application executed by a computer system may complete analysis to select a pre-defined number of targets from a group of potential targets for the advertisement campaign. The selected targets may be then sent one or more advertisements associated with the advertisement campaign.

In some cases, a work station in communication with the analysis application may comprise a user interface for inputting controls and preferences for the analysis. The user interface may comprise one or more slider control that may be used to input adjustments, where the slider may vary between two extremes along an axis. In some cases, the user interface may comprise a two-dimensional (or two-axis) slider, where a point within the two-dimensional space created by the two axes may be adjusted by the user, and adjusting the one point affects both axes of the slider. In some cases, the user interface may provide feedback for adjustments made using the slider(s), such as historical results for a chosen point on the slider(s). Historical information may comprise results of previous advertisement campaigns using similar criteria. Because historical information may only be available at specific points along a substantially continuous range of slider positions, the feedback provided may extrapolate values between slider positions associated with historical information. Also, potential results (e.g., a projection of results based on an extrapolation of historical information on results of previous advertisement campaigns) for a chosen point may be shown on the user interface, where potential results may include number of targets, type of targets, location of targets, etc. Additionally, other types of controls or criteria may be input via the user interface to be used for the analysis, such as number of targets desired, content of advertisement campaign, demographic criteria, behavioral criteria, etc. All of this information may be used to generate a group of targets to be used for the advertisement campaign.

In some embodiments, the slider may control a percentage of targets selected using one or more analysis method. For example, the slider may control the percentage of targets chosen using a filtering method and the percentage of targets chosen using a ranking method, wherein the extremes are 100% from filtering and 100% from ranking. In an exemplary embodiment, the slider may be placed between the two extremes where 60% of the targets are chosen using a filtering method and 40% of the targets are chosen using a ranking method, wherein the total percentage from both methods would add to 100%.

In another embodiment, the slider may control the strength of filtering and/or ranking, wherein both methods of analysis may be used to select each of the targets. For example, one extreme of the slider may comprise strong filtering and weak ranking, while the other extreme may comprise strong ranking and weak filtering. In an exemplary embodiment, the strength of the filtering may be based on the number of filters used to select the targets, while in other embodiments, the strength of the filtering may be based on the required adherence to the filters. The strength of the ranking may be based on the algorithms used to analyze the group of potential targets.

In yet another embodiment, the slider may control the percentage of targets chosen based on demographic information or behavioral information. Demographic information may comprise age, gender, race, location, income, etc. Behavioral information may comprise search history, purchase history, browsing history, response to previous advertisements, etc.

In some embodiments, the first selection method may adjust target selection based on demographic information or behavioral information. In some embodiments, the second selection method may adjust target selection based on filtering or ranking. In some embodiments, the two-axis slider may be controlled by moving a point within the two-dimensional space of the two sliders. In other embodiments, each slider may be controlled independently. In some embodiments, the sliders may be used with other input criteria such as filtering criteria, type of filter(s), ranking criteria, context of advertisement campaign, placement of the advertisement campaign, desired number of targets, etc.

Turning now to FIG. 1, a communication system 100 is described. The communication system may comprise a computer system 102 comprising one or more analysis applications 108. The computer system 102 may communicate with a network 131 via a wired or wireless connection. The network 131 may be a private network, a public network, or a combination thereof. The network 131 may promote voice communications and data communications. Portions of the network 131 may provide an IP Multimedia Subsystem (IMS) network.

In some embodiments, the computer system 102 may communicate with one or more database to obtain or share information. For example, the computer system 102 may communicate with a target information database 116, wherein one or more of the analysis applications 108 may receive target information (such as demographic information, behavioral information, etc.) from the target information database 116. This target information may associate a person and certain attributes of that person with a particular target. In some embodiments, the computer system 102 may access information from multiple databases to perform analysis. In some embodiments, the system 100 may comprise one or more work stations 120 operable to allow users to access and operate the computer system 102, applications 108 and database(s) 116. For example, a salesman may access the system 100 via a workstation 120 to select a group of targets for an advertisement campaign based on the information generated by the analysis application 108.

In some embodiments, the analysis application 108 may be operable to analyze the information stored in and/or obtained from the database(s) 116. For example, the analysis app 108 may be operable to select a set of targets for a particular advertisement campaign based on the information in the database(s) 116, such as demographic data, behavioral data, etc. In some embodiments, an advertisement campaign may be managed and distributed by an ad campaign gateway 118 in communication with the computer system 102. Additionally, the analysis application 108 may be operable to perform multiple kinds of analysis on the same group of targets and/or different groups of targets, such as filtering targets and ranking targets for example. In some embodiments, the analysis performed by the analysis application 108 may be controlled or directed by inputs from the work stations 120. For example, a user may input controls via the work station 120 that are then communicated to the computer system 102 and used by the analysis application 108 to produce a list or report of targets. The targets may be chosen based on the controls input via the work station 120. In some embodiments, the controls may comprise preference between using behavioral data, demographic data, filtering, and/or ranking, as well as the strength and type of filtering and/or ranking.

In some embodiments, filtering may be accomplished by using multiple filters to select targets from a larger group. Ranking may be accomplished by using an algorithm to analyze the targets based on certain criteria. For example, targets may be ranked based on how closely they fit certain criteria input by the user, such as age, income, location, etc. In another example, past behavioral information, such as browsing information, purchase information, etc. may be used to rank targets based on how likely they are to respond to an advertisement. In other embodiments, multiple criteria may be weighted and a total of the weight may be used to rank targets. For example, it may be more important that a target is within a certain age range than that they live or work in a certain location, so the age criteria may be weighted heavier than the location criteria.

In some embodiments, a user may interact with the work station 120 via a user interface 122. The user interface 122 may provide one or more options for inputting controls or preferences for selecting targets for an advertisement campaign. In some embodiments, the user interface 122 may comprise a slider that is variable between two extremes, wherein the slider may be moved to any point between the two extremes or at one of the extremes. In some embodiments, the slider may be moved substantially continuously between the two extremes. In other embodiments, the slider may be moved to one of approximately 100 points between the two extremes. In still other embodiments, the slider may be moved to one of approximately 1000 points between the extremes. Any number of points may be envisioned to exist between the two extremes of the slider(s), wherein the number may range from one to substantially infinite.

Figure 2:
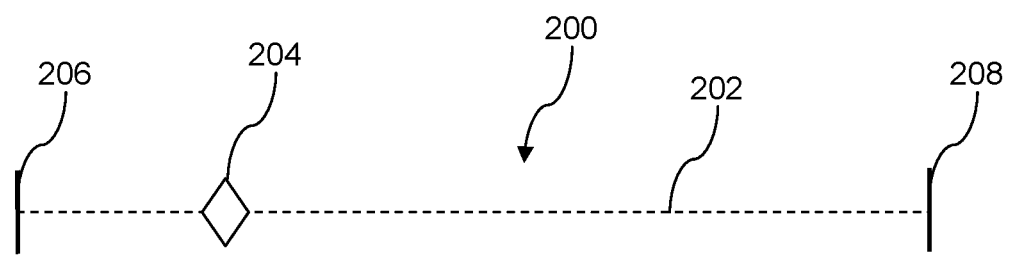
FIG. 2 illustrates an embodiment of sliders which may be incorporated into a user interface.

In some embodiments, the user interface 122 may comprise multiple sliders, two-dimensional (or two-axis) sliders, or other control methods. FIG. 2 illustrates an exemplary one-dimensional slider 200, wherein the slider 200 comprises an axis 202, an adjustor 204, a first extreme 206, and a second extreme 208. The adjustor 204 may be moved along the axis 202 between the two extremes 206 and 208.

In some embodiments, multiple sliders 200 may be used to control the selection of targets.

Figure 3:
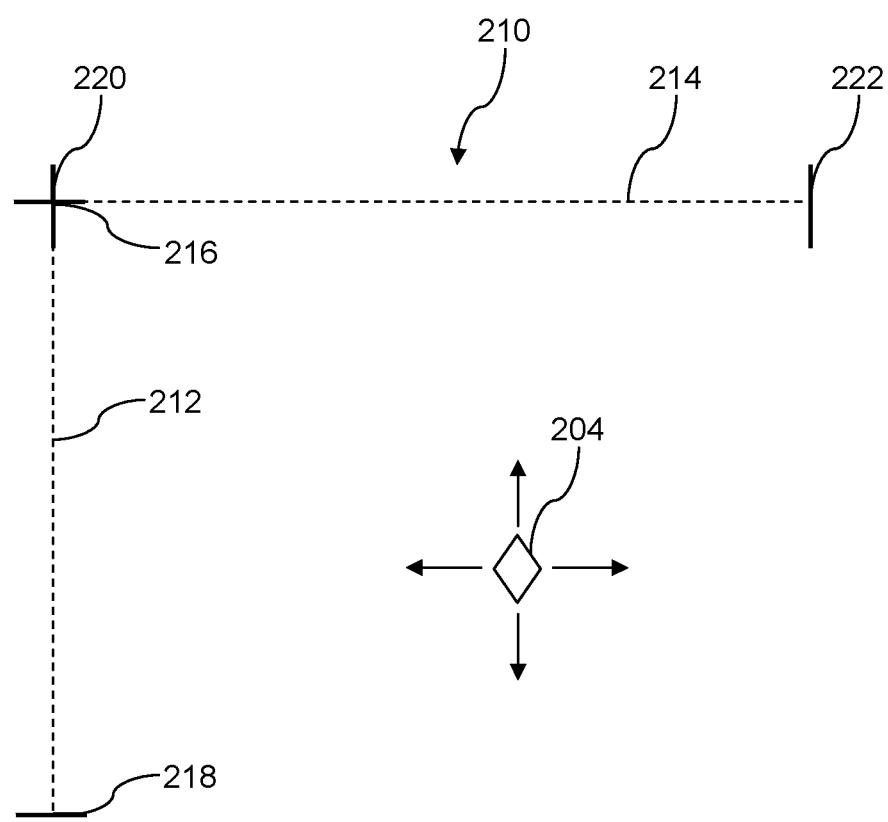
FIG. 3 illustrates another embodiment of sliders which may be incorporated into a user interface.

In some embodiments, a two-axis slider may be used, wherein each axis may comprise different control options. For example, a first axis may control a first selection (or analysis) method and a second axis may control a second selection (or analysis) method. As shown in FIG. 3, a two-axis slider 210 may comprise a first axis 212 and a second axis 214, wherein the first axis 212 has a first extreme 216 and a second extreme 218, and the second axis 214 has a first extreme 220 and a second extreme 222. The adjustor 204 may move with the two-dimensional space created by the two axes 212 and 214, as indicated by the arrows.

In some embodiments, the user interface 122 may provide feedback to the user during the adjustment of the slider(s). For example, historical information or results may be displayed when a certain point on the slider(s) is chosen. Historical information may comprise results of previous advertisement campaigns using similar criteria. Additionally, potential results of the chosen point may be shown on the user interface 122. Potential results may include number of targets, type of targets, location of targets, etc. For example, if a particular point is chosen, the number of targets that may be selected using those criteria may be shown to the user, wherein the user may adjust the point on the slider based on the number of targets desired. In some embodiments, feedback may include pricing or cost of the chosen option, and may be shown on the user interface 122, wherein the slider(s) may offer a range of cost options.

In some embodiments, the user interface 122 may show dynamic feedback based on pre-loaded data accessed by the computer system 102. In some embodiments, the pre-loaded data may comprise a selection or portion of the actual targets to be analyzed by the analysis application 108 based on the input from the user via the user interface 122. Pre-loaded data may comprise a randomly chosen selection of targets (and the information associated with those targets) from the larger group of potential targets to be analyzed. For example, if a certain point on the slider(s) is chosen, the pre-loaded data may be immediately analyzed based on the choice and the result may be shown on the user interface 122. This may provide the user with an estimation of the final results using a particular set of controls and criteria. In some embodiments, the feedback provided to the user may be used to improve or adjust the filters or ranking criteria used to select the targets, wherein a user may have control over the filters used. For example, if the feedback shows that using a particular filter may limit the selected targets to a number less than the desired number of targets, the user may be able to adjust (or remove) that filter to achieve the desired results. In some embodiments, this adjustment may be made by moving the slider(s).

In some embodiments, the analysis application(s) 108 may comprise multiple methods or techniques for using both filtering and ranking to determine the group of selected targets for the advertisement campaign. These methods may be controlled and/or selected via the user interface 122. For example, the group of potential targets may be first filtered using filters input by the user via the work station 120 and then may be ranked using the analysis application 108 based on criteria that may input by the user and/or known by the analysis application 108. In this case, the user may ask for 5000 targets for the advertisement campaign. The group of potential targets may be filtered based on filters input by the user, wherein the analysis application may select an excess of 5000, such as 10,000, targets from the filters, and wherein all targets match on every filter. The filtered targets may then be ranked by the analysis application 108, and the "top" 5000 targets may be selected for the advertisement campaign.

In another example, the group of potential targets may first be ranked using the analysis application 108 based on criteria that may be input by the user and/or known by the analysis application 108, and then filtered using filters input by the user via the work station 120. For example, the group of potential targets may be ranked to determine which of the filters are the most important in selecting targets. Then, the "top" 5000 targets that match the filters may be selected for the advertisement campaign. In another example, filtering and ranking may be used concurrently, wherein a percentage of the targets may be selected using the filters and a percentage of the targets may be selected using ranking. Alternatively, filtering and ranking may be used concurrently, wherein the strength of the filter(s) and strength of the ranking may be chosen using the work station 120.

In some cases, the analysis application 108 may be operable to use more than one method to select targets. For example, the user may request 10000 targets, and the user may input at least two methods of selection via the work station 120. As an example, the analysis application 108 may begin to select half of the targets using the first method and half of the targets using the section method. At any time during the selection process, such as when 2000 targets have been selected, for example, the user may review the results then have the option to adjust the weight of each of the at least two selection methods. In some embodiments, a user may review the results and see that one method is producing better results than a second method, and may choose to select the remainder of the targets using the better method. In some embodiments, more than two methods may be used initially, wherein the user may view the results of all the methods used to select the best method(s) for the selection of targets. Additionally, the analysis application(s) 108 may be operable to automatically select the best method out of multiple selection methods, wherein the user may not need to review the results. For example, the analysis application 108 may be programmed to select a portion of the targets using multiple methods, compare the results of the multiple methods, and then select one (or more) best method to complete the selection of targets. As used herein, "best method" means for the specific ad campaign and/or circumstances. For a different ad campaign or circumstances, a different method may be "best." Additionally, a combination of automatic and manual control may be used.

In some embodiments, a user may have control over the strength of the input filters that are used to select the targets. For example, a user may have the option of adjusting how many of the input filters must be matched for a target to be selected. As an example, a user may have input 10 filters to be matched, and the adjustments may range between requiring all 10 filters to be matched to requiring none of the filters to be matched, wherein any number between 0 and 10 may be selected. The user may be able to view the results of adjusting the filters via the user interface 122. Additionally, the user may have the option of adjusting the degree to which a target must match a filter. In other words, a user may be able to broaden the filters used for selection. For example, one filter may comprise the targets income range, wherein the original filter may be $30,000 to $40,000. The user may then broaden this filter to different degrees, such as $25,000 to $45,000, or $20,000 to $70,000, etc. The user interface 122 may provide feedback in response to these adjustments, such that a user may view the effect of changing the filtering requirements on the selection of the targets. In some embodiments, the methods listed above may be used in any combination to optimize the selection of targets for one or more advertisement campaign.

In some embodiments, similar concepts may be used when scheduling multiple advertisement campaigns for multiple users that may access the same group of targets. For example, one target may be selected for multiple advertisement campaigns using one or more of the methods described above. However, rules or policies concerning delivery of ads to a target may prevent the target from being used in all of the campaigns it has been chosen for. In this case, multiple factors may be used to determine which campaign(s) may be sent to a target and when the campaigns may be sent to the target, wherein the factors may be weighted by importance. These factors may include the business rules and policies for sending advertisements, the duration and date of completion for each of the campaigns, selecting matches that may be good enough if not the best, dividing up the targets across all campaigns, where the customer is ranked for each of the campaigns, the delivery method of the advertisements (SMS, banner ad, email, offer, etc.) for each campaign, prioritizing rates of click-through, prioritizing based on campaign revenue, and maximizing the best return-on-investment for each of the campaigns. Multiple advertisement campaigns may be optimized based on these factors.

Figure 4:
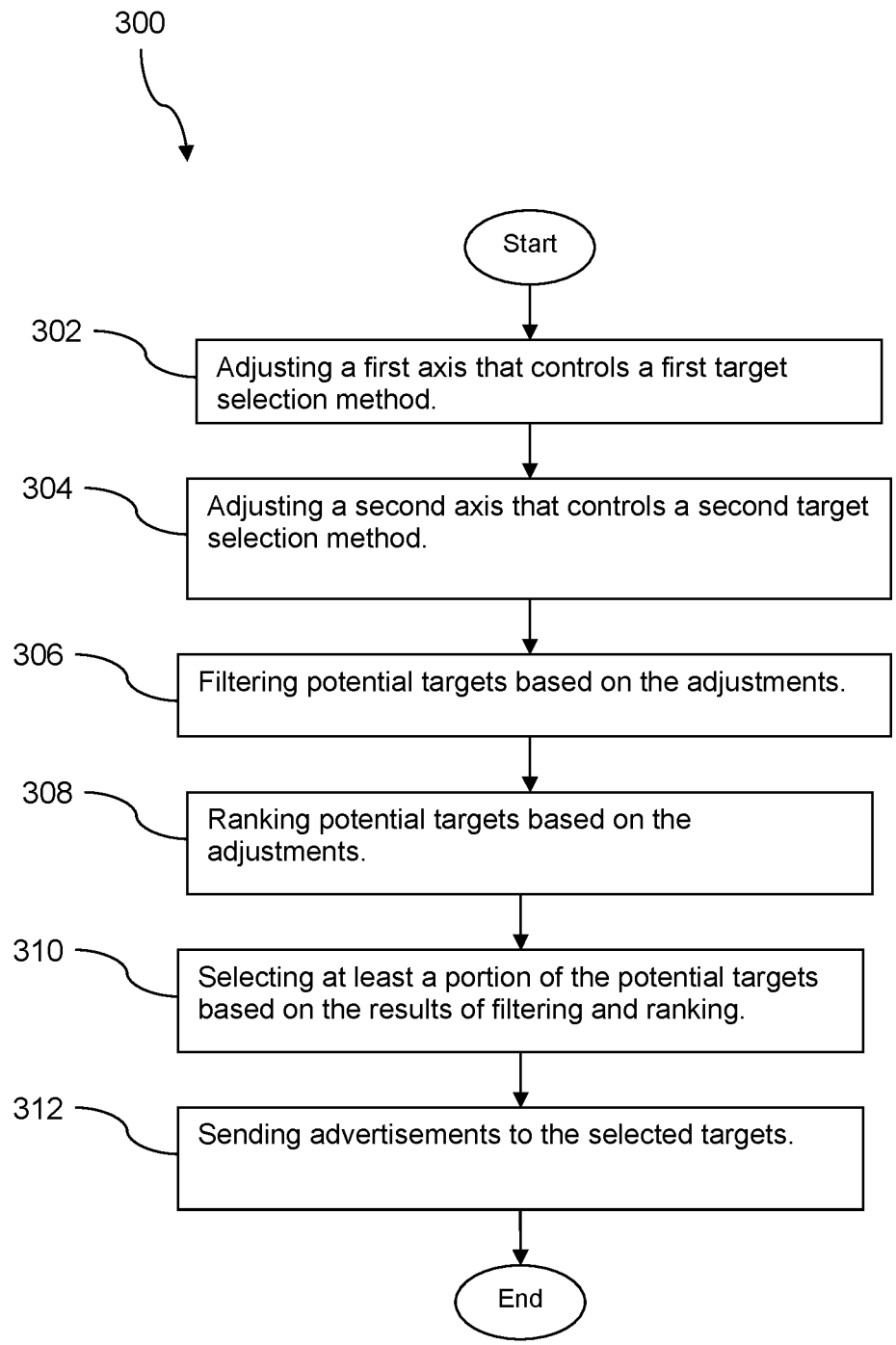
FIG. 4 is a flow chart illustrating a method according to an embodiment of the disclosure.

Turning now to FIG. 4, a method 300 for selecting targets for an advertisement campaign is described. At step 302, a first axis may be adjusted, wherein the first axis controls a first target selection method. At step 304, a second axis may be adjusted, wherein the second axis controls a second target selection method. In some embodiments, a target for an advertisement campaign may be selected from a group of people based on an increased probability that the target will respond to the advertisement campaign. In some embodiments, the first and second axes may be shown on and controlled via a user interface. In some embodiments, the first selection method adjusts selecting targets between demographics and behavior. In some embodiments, the second selection method adjusts selecting targets between filtering and ranking. At step 306, potential targets may be filtered based on the adjustments made in steps 302 and 304 by an application executed by a computer system. At step 308, potential targets may be ranked based on the adjustments made in steps 302 and 304 by an application executed by a computer system. In some embodiments, the filtered potential targets and the ranked potential targets are the same group of potential targets. In some embodiments, the filtered potential targets and the ranked potential targets are different groups of potential targets. At step 310, at least a portion of the potential targets may be selected based on the results of the filtering and ranking. In some embodiments, selecting at least a portion of the potential targets comprises selecting a pre-defined number of targets input by the user. At step 312, one or more advertisement may be sent to the selected targets. In some embodiments, the cost to the advertiser or marketer of completing the method is variable based on the selection methods. In some embodiments, the cost variations are shown on the user interface and change with adjustments of the axes. In some embodiments, the historical results of previous advertisement campaigns for a particular adjustment are shown on the user interface. In some embodiments, the user interface shows dynamic responses to adjustments based on effects on pre-loaded target information.

Figure 5:
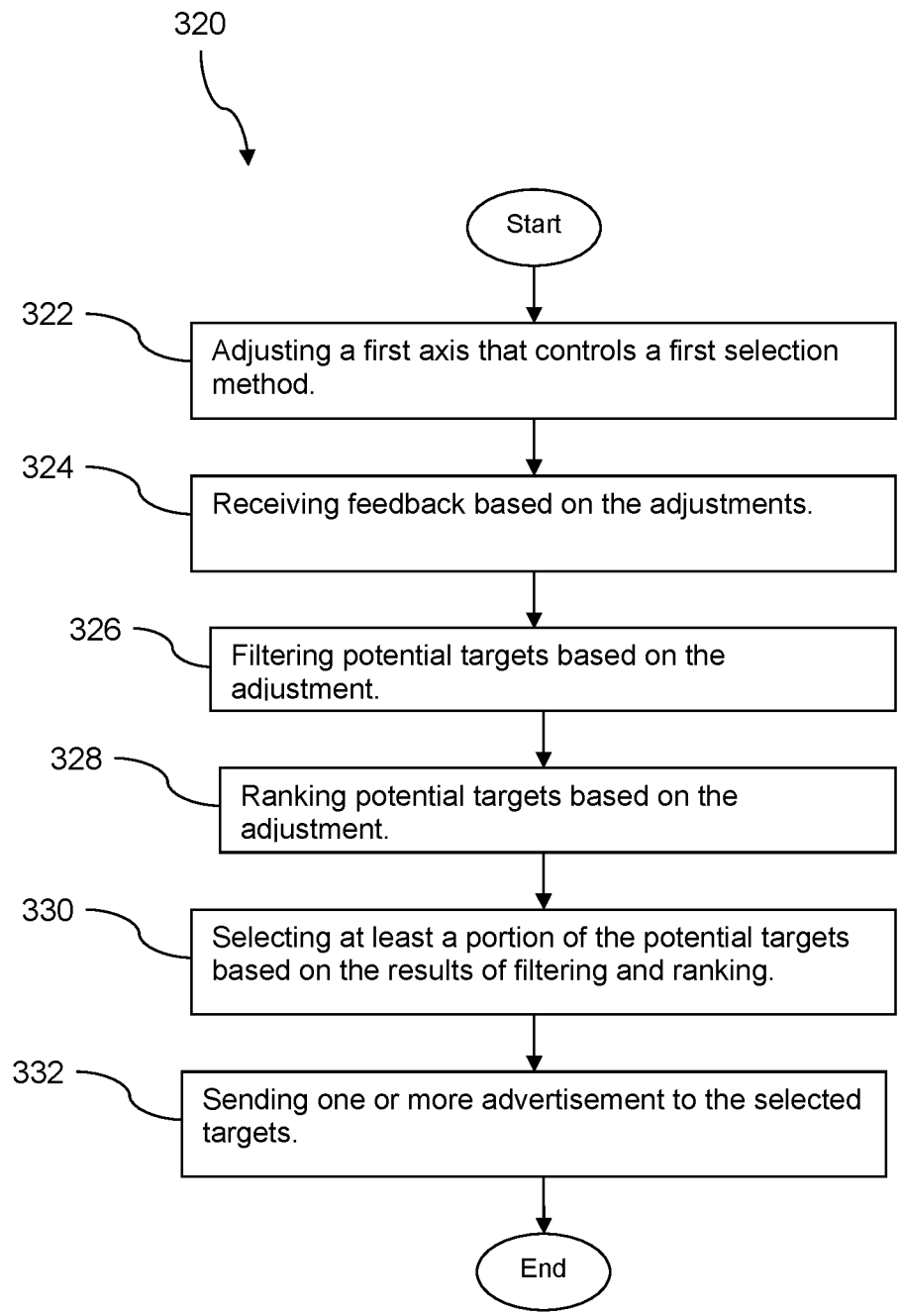
FIG. 5 is a flow chart illustrating another method according to an embodiment of the disclosure.

Turning now to FIG. 5, a method 320 for choosing targets for an advertisement campaign is described. At step 322, a first axis may be adjusted, wherein the first axis controls a first target selection method. In some embodiments, the method 320 may further comprise adjusting a second axis that controls a second target selection method, wherein the filtering and ranking may be affected by both adjustments. At step 324, feedback may be received based on the adjustments. In some embodiments, the feedback comprising information about the possible target selection, including number of targets, type of targets, location of targets, etc. At step 326, potential targets may be filtered based on the adjustments made in step 322. At step 328, potential targets may be ranked based on the adjustments made in step 322. At step 330, at least a portion of the potential targets may be selected based on the results of the filtering and ranking. At step 332, one or more advertisement may be sent to the selected targets. In some embodiments, the first axis may be shown on and controlled via a user interface, and the feedback may be shown on the user interface with the first axis. In some embodiments, the targets may be filtered and ranked based on demographic information. In some embodiments, the targets may be filtered and ranked based on behavioral information. In some embodiments, behavioral information may comprise search history, purchase history, browsing history, response to previous advertisements, etc. In other embodiments, a combination of demographic and behavioral information may be used.

In some embodiments, the method 320 may further comprise adjusting the first axis further based on the received feedback. In some embodiments, adjusting the first axis may comprise adjusting a percentage of targets chosen based on filtering, wherein the remaining percentage of targets is chosen based on ranking. In some embodiments, adjusting the first axis may comprise adjusting the strength of the filtering and ranking, wherein one extreme comprises strong filtering and weak ranking and the other extreme comprises strong ranking and weak filtering. In some embodiments, the strength of the filtering or ranking may be adjusted by adding and/or taking away filters or ranking criteria. In other embodiments, the filtering and ranking may also be adjusted by selecting the order in which they are completed. For example, the potential targets may be filtered first and then ranked, or they may be ranked first and then filtered. In some embodiments, filters and/or ranking criteria may be manually chosen by a user.

Figure 6:
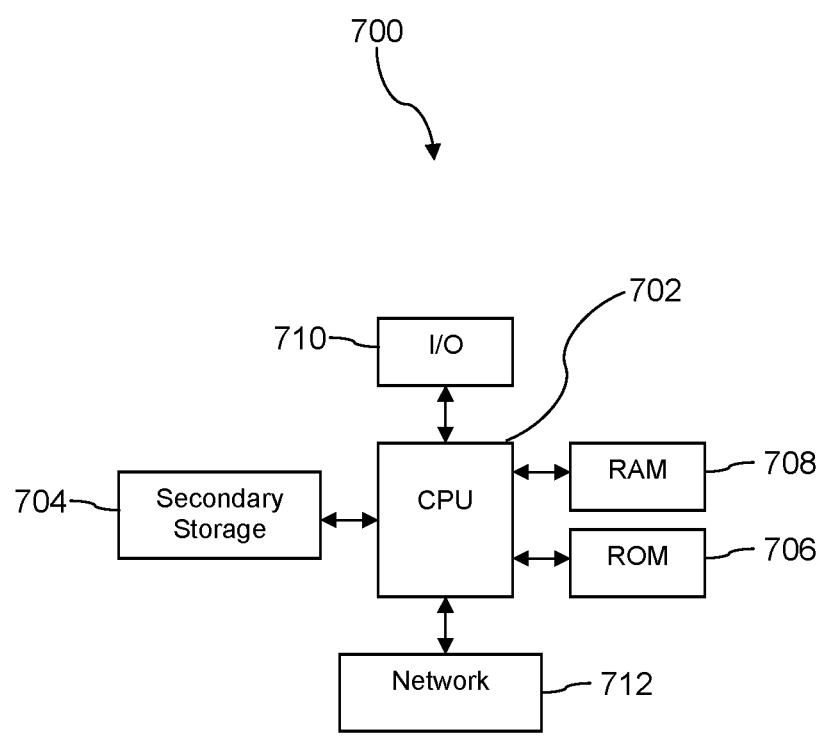
FIG. 6 illustrates an exemplary computer system suitable for implementing the several embodiments of the disclosure.

FIG. 6 illustrates a computer system 700 suitable for implementing one or more embodiments disclosed herein. The computer system 700 includes a processor 702 (which may be referred to as a central processor unit or CPU) that is in communication with memory devices including secondary storage 704, read only memory (ROM) 706, random access memory (RAM) 708, input/output (I/O) devices 710, and network connectivity devices 712. The processor 702 may be implemented as one or more CPU chips.

It is understood that by programming and/or loading executable instructions onto the computer system 700, at least one of the CPU 702, the RAM 708, and the ROM 706 are changed, transforming the computer system 700 in part into a particular machine or apparatus having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

The secondary storage 704 is typically comprised of one or more disk drives or tape drives and is used for non-volatile storage of data and as an over-flow data storage device if RAM 708 is not large enough to hold all working data. Secondary storage 704 may be used to store programs which are loaded into RAM 708 when such programs are selected for execution. The ROM 706 is used to store instructions and perhaps data which are read during program execution. ROM 706 is a non-volatile memory device which typically has a small memory capacity relative to the larger memory capacity of secondary storage 704. The RAM 708 is used to store volatile data and perhaps to store instructions. Access to both ROM 706 and RAM 708 is typically faster than to secondary storage 704. The secondary storage 704, the RAM 708, and/or the ROM 706 may be referred to in some contexts as computer readable storage media and/or non-transitory computer readable media.

I/O devices 710 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 712 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards such as code division multiple access (CDMA), global system for mobile communications (GSM), long-term evolution (LTE), worldwide interoperability for microwave access (Wi-MAX), and/or other air interface protocol radio transceiver cards, and other well-known network devices. These network connectivity devices 712 may enable the processor 702 to communicate with the Internet or one or more intranets. With such a network connection, it is contemplated that the processor 702 might receive information from the network, or might output information to the network in the course of performing the above-described method steps. Such information, which is often represented as a sequence of instructions to be executed using processor 702, may be received from and outputted to the network, for example, in the form of a computer data signal embodied in a carrier wave.

Such information, which may include data or instructions to be executed using processor 702 for example, may be received from and outputted to the network, for example, in the form of a computer data baseband signal or signal embodied in a carrier wave. The baseband signal or signal embedded in the carrier wave, or other types of signals currently used or hereafter developed, may be generated according to several methods well known to one skilled in the art. The baseband signal and/or signal embedded in the carrier wave may be referred to in some contexts as a transitory signal.

The processor 702 executes instructions, codes, computer programs, scripts which it accesses from hard disk, floppy disk, optical disk (these various disk based systems may all be considered secondary storage 704), ROM 706, RAM 708, or the network connectivity devices 712. While only one processor 702 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 704, for example, hard drives, floppy disks, optical disks, and/or other device, the ROM 706, and/or the RAM 708 may be referred to in some contexts as non-transitory instructions and/or non-transitory information.

In an embodiment, the computer system 700 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 700 to provide the functionality of a number of servers that is not directly bound to the number of computers in the computer system 700. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 700, at least portions of the contents of the computer program product to the secondary storage 704, to the ROM 706, to the RAM 708, and/or to other non-volatile memory and volatile memory of the computer system 700. The processor 702 may process the executable instructions and/or data structures in part by directly accessing the computer program product, for example by reading from a CD-ROM disk inserted into a disk drive peripheral of the computer system 700. Alternatively, the processor 702 may process the executable instructions and/or data structures by remotely accessing the computer program product, for example by downloading the executable instructions and/or data structures from a remote server through the network connectivity devices 712. The computer program product may comprise instructions that promote the loading and/or copying of data, data structures, files, and/or executable instructions to the secondary storage 704, to the ROM 706, to the RAM 708, and/or to other non-volatile memory and volatile memory of the computer system 700.

In some contexts, the secondary storage 704, the ROM 706, and the RAM 708 may be referred to as a non-transitory computer readable medium or a computer readable storage media. A dynamic RAM embodiment of the RAM 708, likewise, may be referred to as a non-transitory computer readable medium in that while the dynamic RAM receives electrical power and is operated in accordance with its design, for example during a period of time during which the computer system 700 is turned on and operational, the dynamic RAM stores information that is written to it. Similarly, the processor 702 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A two-axis slider graphical user interface system, comprising:
 a work station communicatively coupled to a server via a network, the workstation comprising:
  a processor;
  a non-transitory memory; and
  an application stored in the non-transitory memory that, when executed by the processor:
   displays a graphical user interface comprising a two-axis slider within a two-dimensional space that is bounded by a first axis and a second axis, wherein the first axis corresponds at a first extreme to a ranking selection method and at a second extreme to a filtering selection method, and wherein the second axis corresponds at a first extreme to a demographic selection method and at a second extreme to a behavioral selection method, receives, via the two-axis slider, an adjustment that indicates a relative position of the two-axis slider along the first axis and the second axis in the two-dimensional space of the graphical user interface, wherein the adjustment is a control input from the two-axis slider, and wherein the control input indicates a relative importance of the demographic selection method versus the behavioral selection method and a relative importance of the filtering selection method versus the ranking selection method, receives, via the graphical user interface, input criteria associated with mobile communication devices, wherein the input criteria comprises demographic information and behavioral information, sends the input criteria and control input to the server, wherein the server adjusts a weight for each of the selection methods based on the control input from the two-axis slider, automatically receives selection of a weighted portion for each of the selection methods based on the adjustments, wherein the demographic selection method has a greater value weight than the behavioral selection method when the two axis slider is closer along the second axis to the extreme indicating the demographic selection method than to the extreme indicating the behavioral selection method, wherein the behavioral selection method has a greater value weight than the demographic selection method when the two axis slider is closer along the second axis to the extreme indicating the behavioral selection method than to the extreme indicating the demographic selection method, wherein the ranking selection method has a greater value weight than the filtering selection method when the two axis slider is closer along the first axis to the extreme indicating the ranking selection method than to the extreme indicating the filtering selection method, and wherein the filtering selection method has a greater value weight than the ranking selection method when the two axis slider is closer along the first axis to the extreme indicating the filtering selection method than to the extreme indicating the ranking selection method, receives a selection of a defined number of mobile communication devices corresponding to the weighted portion for each of the selection methods, the weighted portion for each of the selection methods comprising a relative importance of each of the selection methods to the selection of the defined number of mobile communication devices, wherein the selection is made by selecting a first portion of the mobile communication devices according to the ranking selection method and the filtering selection method with a ratio of weights of the ranking selection method to the filtering selection method determining a ratio of devices among the first portion of the mobile communication devices selected according to the ranking selection method versus the filtering selection method, and selecting a second portion of the mobile communication devices from among the first portion of the mobile communication devices according to the demographic selection method and the behavior selection method with a ratio of weights of the demographic selection method to the behavior selection method determining a ratio of devices among the second portion of the mobile communication devices selected according to the demographic selection method versus the behavior selection, and wherein a number of mobile communication devices representing the second portion of mobile communication devices equals the defined number of mobile communication devices, and dynamically displays feedback about the defined number of mobile communication devices on the graphical user interface, wherein the feedback indicates historical information for previous selections of mobile communication devices according to criteria similar to the weighted portion for each of the selection methods and potential results based on the historical information and the defined number of mobile communication devices, wherein the historical information is results of previous advertisement campaigns for similar input criteria and control input, and wherein the potential results are a projection of results of an advertisement campaign based on an extrapolation of the historical information and the defined number of mobile communication devices.

2. The system of claim 1, wherein the demographic information corresponds to at least one of age, location, or income, and wherein the behavioral information corresponds to at least one of historical browsing information or historical purchase information.

3. The system of claim 1, wherein the graphical user interface comprises a plurality of two-axis sliders for inputting adjustments to the weight of each of the two selection methods.

4. The system of claim 1, wherein the dynamic display of feedback is based on pre-loaded data that comprises a portion of target mobile communication devices to be analyzed based on the input criteria and the control input from the two-axis slider.

5. A two-axis slider graphical user interface method, comprising:

displaying, on a display of a work station computer communicatively coupled to a server, a graphical user interface comprising a two-axis slider within a two-dimensional space that is bounded by a first axis and a second axis, wherein the first axis corresponds at a first extreme to a ranking selection method and at a second extreme to a filtering selection method, and wherein the second axis corresponds at a first extreme to a demographic selection method and at a second extreme to a behavioral selection method;

determining, by the server, multiple selection methods for selecting mobile communication devices, wherein each selection method corresponds with one of the first axis or the second axis within the two-dimensional space displayed on the graphical user interface, wherein the multiple selection methods comprise the ranking selection method, the filtering selection method, the demographic selection method, and the behavioral selection method;

receiving, by the server executing an analysis application via the graphical user interface, input criteria and control input from the two-axis slider, wherein the control input indicates a relative position of the two-axis slider along the first axis and the second axis, wherein the control input indicates a relative importance of the demographic selection method versus the behavioral selection method and a relative importance of the filtering selection method versus the ranking selection method, and wherein the input criteria comprises demographic information and behavioral information;

adjusting, by the server via the two-axis slider, a weight for each of the multiple selection methods based on the control input from the two-axis slider;

accessing, by the server, information from an information database based on the input criteria and the control input from the two-axis slider;

automatically selecting, by the server, a weighted portion for each of the multiple selection methods based on the adjustments, wherein the demographic selection method has a greater value weight than the behavioral selection method when the two axis slider is closer along the second axis to the extreme indicating the demographic selection method than to the extreme indicating the behavioral selection method, wherein the behavioral selection method has a greater value weight than the demographic selection method when the two axis slider is closer along the second axis to the extreme indicating the behavioral selection method than to the extreme indicating the demographic selection method, wherein the ranking selection method has a greater value weight than the filtering selection method when the two axis slider is closer along the first axis to the extreme indicating the ranking selection method than to the extreme indicating the filtering selection method, and wherein the filtering selection method has a greater value weight than the ranking selection method when the two axis slider is closer along the first axis to the extreme indicating the filtering selection method than to the extreme indicating the ranking selection method;

selecting, by the server, a defined number of mobile communication devices corresponding to the weighted portion for each of the multiple selection methods, the weighted portion for each of the multiple selection methods comprising a relative importance of each of the multiple selection methods to the selection of the defined number of mobile communication devices, wherein the selection is made by selecting a first portion of the mobile communication devices according to the ranking selection method and the filtering selection method with a ratio of weights of the ranking selection method to the filtering selection method determining a ratio of devices among the first portion of the mobile communication devices selected according to the ranking selection method versus the filtering selection method, and selecting a second portion of the mobile communication devices from among the first portion of the mobile communication devices according to the demographic selection method and the behavior selection method with a ratio of weights of the demographic selection method to the behavior selection method determining a ratio of devices among the second portion of the mobile communication devices selected according to the demographic selection method versus the behavior selection, and wherein a number of mobile communication devices representing the second portion of mobile communication devices equals the defined number of mobile communication devices; and dynamically providing, by the server, feedback about the defined number of mobile communication devices to the graphical user interface of the work station, wherein the feedback indicates historical information for previous selections of mobile communication devices according to criteria similar to the weighted portion for each of the multiple selection methods and potential results based on the historical information and the defined number of mobile communication devices, wherein the historical information is results of previous advertisement campaigns for similar input criteria and control input, and wherein the potential results are a projection of results of an advertisement campaign based on an extrapolation of the historical information and the defined number of mobile communication devices.

6. The computer-implemented method of claim 5, wherein the information database comprises the demographic information and the behavioral information, each of which corresponding to mobile communication devices that communicatively couple to a network.

7. The computer-implemented method of claim 5, wherein the graphical user interface comprises a plurality of two-axis sliders for inputting adjustments to the weight of each of the multiple selection methods.

8. The computer-implemented method of claim 5, wherein dynamically providing feedback is based on preloaded data that comprises a portion of target mobile communication devices to be analyzed based on the input criteria and the control input from the two-axis slider.

9. The computer-implemented method of claim 8, wherein the demographic information corresponds to at least one of age, location, or income, and wherein the behavioral information corresponds to at least one of historical browsing information or historical purchase information.

10. The computer-implemented method of claim 5, wherein dynamically providing feedback is in response to the selecting the defined number of selected mobile communication devices.

11. A two-axis slider graphical user interface system, comprising:

a server communicatively coupled to a work station via a network, the server comprising:
 a processor;
 a non-transitory memory; and
 an analysis application stored in the non-transitory memory that, when executed by the processor:
  provides, to a display of the work station, a graphical user interface comprising a two-axis slider within a two-dimensional space that is bounded by a first axis and a second axis, wherein the first axis corresponds at a first extreme to a ranking selection method and at a second extreme to a filtering selection method, and wherein the second axis corresponds at a first extreme to a demographic selection method and at a second extreme to a behavioral selection method,
  determines multiple selection methods for selecting mobile communication devices, wherein each selection method corresponds with one of the first axis or the second axis within the two-dimensional space displayed on the graphical user interface, and wherein the multiple selection methods comprise the ranking selection method, the filtering selection method, the demographic selection method, and the behavioral selection method, receives, via the graphical user interface, input criteria and control input from the two-axis slider, wherein the control input indicates a relative position of the two-axis slider along the first axis and the second axis, wherein the control input indicates a relative importance of the demographic selection method versus the behavioral selection method and a relative importance of the filtering selection method versus the ranking selection method, and wherein the input criteria comprises demographic information and behavioral information, adjusts, via the two-axis slider, a weight for each of the multiple selection methods based on the control input from the two-axis slider, accesses information associated with mobile communication devices from a database based on the input criteria and the control input from the two-axis slider, automatically selects a weighted portion for each of the multiple selection methods based on the adjustments, wherein the demographic selection method has a greater value weight than the behavioral selection method when the two axis slider is closer along the second axis to the extreme indicating the demographic selection method than to the extreme indicating the behavioral selection method, wherein the behavioral selection method has a greater value weight than the demographic selection method when the two axis slider is closer along the second axis to the extreme indicating the behavioral selection method than to the extreme indicating the demographic selection method, wherein the ranking selection method has a greater value weight than the filtering selection method when the two axis slider is closer along the first axis to the extreme indicating the ranking selection method than to the extreme indicating the filtering selection method, and wherein the filtering selection method has a greater value weight than the ranking selection method when the two axis slider is closer along the first axis to the extreme indicating the filtering selection method than to the extreme indicating the ranking selection method, selects a defined number of mobile communication devices corresponding to the weighted portion for each of the multiple selection methods, the weighted portion for each of the multiple selection methods comprising a relative importance of each of the multiple selection methods to the selection of the defined number of mobile communication devices, wherein the selection is made by selecting a first portion of the mobile communication devices according to the ranking selection method and the filtering selection method with a ratio of weights of the ranking selection method to the filtering selection method determining a ratio of devices among the first portion of the mobile communication devices selected according to the ranking selection method versus the filtering selection method, and selecting a second portion of the mobile communication devices from among the first portion of the mobile communication devices according to the demographic selection method and the behavior selection method with a ratio of weights of the demographic selection method to the behavior selection method determining a ratio of devices among the second portion of the mobile communication devices selected according to the demographic selection method versus the behavior selection, and wherein a number of mobile communication devices representing the second portion of mobile communication devices equals the defined number of mobile communication devices, and dynamically provides feedback about the defined number of mobile communication devices to the graphical user interface of the work station, wherein the feedback indicates historical information for previous selections of mobile communication devices according to criteria similar to the weighted portion for each of the multiple selection methods and potential results based on the historical information and the defined number of mobile communication devices, wherein the historical information is results of previous advertisement campaigns for similar input criteria and control input, and wherein the potential results are a projection of results of an advertisement campaign based on an extrapolation of the historical information and the defined number of mobile communication devices.

12. The computer-implemented method of claim 11, wherein the graphical user interface comprises a plurality of two-axis sliders for inputting adjustments to the weight of each of the multiple selection methods.

13. The computer-implemented method of claim 11, wherein the server dynamically provides feedback based on pre-loaded data that comprises a portion of target mobile communication devices to be analyzed based on the input criteria and the control input from the two-axis slider.

14. The system of claim 11, wherein the demographic information corresponds to at least one of age, location, or income, and wherein the behavioral information corresponds to at least one of historical browsing information or historical purchase information.

15. The system of claim 11, wherein the server dynamically provides feedback in response to the selection of the defined number of mobile communication devices.

* * * * *